United States Patent
Han et al.

(10) Patent No.: US 12,247,749 B2
(45) Date of Patent: Mar. 11, 2025

(54) AIR CONDITIONING SYSTEM WITH AN INTEGRATED HEAT EXCHANGER

(71) Applicants: HYUNDAI MOTOR COMPANY, Seoul (KR); KIA CORPORATION, Seoul (KR); Hanon Systems, Daejeon (KR)

(72) Inventors: Kwang Ok Han, Seoul (KR); Gee Young Shin, Suwon-si (KR); Su Yeon Kang, Seoul (KR); Dong Ho Kwon, Yongin-si (KR); Myung Hoe Kim, Seoul (KR); Dae Hee Lee, Incheon (KR); In Jae Kang, Daejeon (KR); Tae Young Park, Daejeon (KR); Jae Chun Ryu, Daejeon (KR)

(73) Assignees: HYUNDAI MOTOR COMPANY, Seoul (KR); KIA CORPORATION, Seoul (KR); Hanon Systems, Daejeon (KR)

( * ) Notice: Subject to any disclaimer, the term of this patent is extended or adjusted under 35 U.S.C. 154(b) by 204 days.

(21) Appl. No.: 17/990,048

(22) Filed: Nov. 18, 2022

(65) Prior Publication Data
US 2023/0417426 A1   Dec. 28, 2023

(30) Foreign Application Priority Data

Jun. 23, 2022   (KR) .................. 10-2022-0077054

(51) Int. Cl.
| | |
|---|---|
| F25B 29/00 | (2006.01) |
| F24F 1/0007 | (2019.01) |
| F24F 1/0059 | (2019.01) |
| F25B 9/06 | (2006.01) |
| F25B 41/20 | (2021.01) |

(52) U.S. Cl.
CPC ........ *F24F 1/0059* (2013.01); *F24F 1/00073* (2019.02); *F25B 9/06* (2013.01); *F25B 41/20* (2021.01)

(58) Field of Classification Search
CPC ..... F24F 1/0059; F24F 1/00073; F25B 41/20; F25B 9/06
USPC ....................................... 165/48.1
See application file for complete search history.

(56) References Cited

U.S. PATENT DOCUMENTS

| | | |
|---|---|---|
| 2018/0072131 A1 | 3/2018 | Lee et al. |
| 2018/0162192 A1 | 6/2018 | Lee et al. |
| 2019/0351730 A1 | 11/2019 | Mullett et al. |

FOREIGN PATENT DOCUMENTS

| | | | |
|---|---|---|---|
| DE | 102013109666 A1 | * | 3/2015 |
| JP | 2003042597 A | | 2/2003 |
| JP | 2006082780 A | | 3/2006 |

(Continued)

*Primary Examiner* — Davis D Hwu
(74) *Attorney, Agent, or Firm* — Lempia Summerfield Katz LLC (57) ABSTRACT

An air conditioning system is provided with an integrated heat exchanger. The air conditioning system generates heating air or cooling air through the integrated heat exchanger that adjusts the temperature of conditioning air by circulating coolant, thus securing cooling and heating efficiency. The air conditioning system adjusts temperature by the coolant circulated in the integrated heat exchanger such that a temperature adjustment door for adjusting the temperature of the conditioning air is eliminated, the number of components is decreased, and the size of an overall package is reduced.

12 Claims, 8 Drawing Sheets

(56) References Cited

FOREIGN PATENT DOCUMENTS

| KR | 20080076224 A | 8/2008 |
| KR | 20080092527 A | 10/2008 |
| KR | 20160133729 A | 11/2016 |

* cited by examiner

AIR CONDITIONING SYSTEM WITH AN INTEGRATED HEAT EXCHANGER

CROSS REFERENCE TO RELATED APPLICATION

The present application claims the benefit of and priority to Korean Patent Application No. 10-2022-0077054, filed on Jun. 23, 2022, the entire contents of which are incorporated herein by reference.

FIELD

The present disclosure relates to an air conditioning system with an integrated heat exchanger. More particularly, the present disclosure relates to an air conditioning system in which the integrated heat exchanger is applied.

BACKGROUND

The statements in this section merely provide background information related to the present disclosure and may not constitute prior art.

Recently, in order to implement environmentally friendly technology and solve problems such as energy exhaustion, an electric vehicle is emerging as a social issue. The electric vehicle is operated using a motor that receives electricity from a battery and outputs power. Thus, the electric vehicle is advantageous in that there is no emission of carbon dioxide, noise is very small, and the energy efficiency of the motor is higher than that of an engine, so the electric vehicle becomes popular as an eco-friendly vehicle.

The core technology for realizing such an electric vehicle is a technology related to a battery module, and recent studies on weight reduction, miniaturization, and short charging time of a battery are being actively conducted. The battery module should be used under an optimal temperature environment to maintain optimal performance and long lifespan. However, we have discovered that it is difficult to use the battery module under the optimal temperature environment due to heat generated during an operation and external temperature change.

Further, since the electric vehicle has no waste heat source generated during combustion in a separate engine like an internal combustion engine, the electric vehicle performs the indoor heating of the vehicle in winter with an electric heating device, and requires warm-up to improve battery charging and discharging performance in cold weather. Thus, the electric vehicle should be provided with a separate coolant heating type electric heater. In other words, in order to maintain the optimal temperature environment of the battery module, the electric vehicle uses a technology for operating a heating and cooling system for adjusting the temperature of the battery module separately from a heating and cooling system for indoor air conditioning of a vehicle.

In the case of the air conditioning system for indoor air conditioning of the vehicle, a heat-pump technology for minimizing heating energy consumption is applied to increase mileage, thereby minimizing energy consumption. The air conditioning system is provided with a temperature adjustment door for optionally adjusting the supply of cooling air and heating air, such that respective components including an evaporator and a heater are spaced apart from each other, thus increasing an overall size of the air conditioning system and the vehicle. Further, when air conditioning is performed only by circulating refrigerant, the capacity of each component for circulating the refrigerant is increased, thereby increasing the size of the overall package.

The foregoing is intended merely to aid in the understanding of the background of the present disclosure, and is not intended to mean that the description in this BACKGROUND section falls within the purview of the related art that is already known to those having ordinary skill in the art.

SUMMARY OF THE PRESENT DISCLOSURE

The present disclosure provides an air conditioning system with an integrated heat exchanger, such that cooling and heating efficiency using coolant is secured, the number of doors for adjusting the temperature of conditioning air for each mode is reduced, and an overall package is made compact.

In one embodiment of the present disclosure, an air conditioning system with an integrated heat exchanger includes: a refrigerant circuit through which a refrigerant is circulated. The refrigerant circuit includes a compressor, a condenser, an expander, and an evaporator. The air conditioning system further includes: a first coolant circuit through which heating coolant exchanging heat with the condenser of the refrigerant circuit is circulated; and a second coolant circuit through which cooling coolant exchanging heat with the evaporator of the refrigerant circuit is circulated. The air conditioning system further includes: an indoor heat exchanger which is provided in an air conditioner and to which the first coolant circuit and the second coolant circuit are connected to receive the heating coolant and the cooling coolant and thereby generate heating air or cooling air. The air conditioning system further includes: a valve module to which the first coolant circuit and the second coolant circuit are connected and which optionally controls the heating coolant or the cooling coolant circulated in the indoor heat exchanger.

In one embodiment, the indoor heat exchanger may include a first heat exchanging part to which the first coolant circuit is connected to dissipate heat through the heating coolant, and a second heat exchanging part to which the second coolant circuit is connected to absorb heat through the cooling coolant.

The air conditioning system may further include a heater provided in the air conditioner to be spaced apart from the indoor heat exchanger. In one embodiment, the indoor heat exchanger and the heater may be arranged at an angle.

In another embodiment, the indoor heat exchanger and the heater may be arranged such that upper portions thereof come near to each other and lower portions thereof move away from each other.

The heater may be arranged to form at least one path in the air conditioner, and thus a portion of air, which has passed through the indoor heat exchanger, does not pass through the heater. In other words, the portion of air flows via the at least one path after passed through the indoor heat exchanger.

The at least one path may include a bleed path formed in an upper end of the heater, and a bypass path formed in a lower end of the heater.

A guide part may be formed on an outlet of the bleed path in the air conditioner, and the guide part may be obliquely formed so that air passing through the bleed path flows to the heater.

The bleed path may be formed to pass 25% or less of a volume of air passing through the heater.

The air conditioner may be provided with an air inlet and a plurality of air outlets. In one embodiment, the plurality of air outlets may include: at least one defrost vent and front vent arranged in an upper portion of the air conditioner; and at least one rear vent arranged in a lower portion of the air conditioner. In one embodiment, a defrost door is provided in the defrost vent, a front door is provided in the front vent, and at least one rear door is provided in the at least one rear vent, respectively.

The at least one rear door may include: a first rear door which optionally allows air passing through the heater to be circulated in the at least one rear vent; and a second rear door which optionally allows air passing through the indoor heat exchanger in the bypass path on the lower end of the heater to be circulated in the at least one rear vent without passing through the heater.

The first coolant circuit may include a first water pump and an outdoor heat exchanger, and the second coolant circuit may include a second water pump.

The first coolant circuit and the second coolant circuit may optionally share each coolant via a plurality of sharing valves.

As described above, an air conditioning system with an integrated heat exchanger generates heating air or cooling air through an integrated heat exchanger that adjusts the temperature of conditioning air by circulating coolant, thus securing cooling and heating efficiency. The air conditioning system further adjusts temperature by the coolant circulated in the integrated heat exchanger, so a temperature adjustment door for adjusting the temperature of the conditioning air is eliminated, thus reducing the number of components. The air conditioning system applies the integrated heat exchanger, so the arrangement of components is optimized, thus reducing the size of an overall package.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

The same reference numerals are used throughout the drawings to designate the same or similar components.

Further, the terms "module", "unit'", etc. described in this specification are given or used together for the ease of description, but do not have a distinct meaning or function.

When it is determined that the detailed description of the known art related to the present disclosure may be obscure the gist of the present disclosure, the detailed description thereof has been omitted. Further, it is to be understood that the accompanying drawings are merely for making those having ordinary skill in the art easily understand embodiments disclosed herein, and the present disclosure is intended to cover not only the embodiments disclosed herein, but also various alternatives, modifications, equivalents and other embodiments that fall within the spirit and scope of the present disclosure.

It will be understood that, although the terms "first", "second", etc. may be used herein to describe various elements, these elements should not be limited by these terms. These terms are only used to distinguish one element from another element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

Herein, the singular forms are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

When a component, device, element, or the like of the present disclosure is described as having a purpose or performing an operation, function, or the like, the component, device, or element should be considered herein as being "configured to" meet that purpose or to perform that operation or function.

Figure 1:
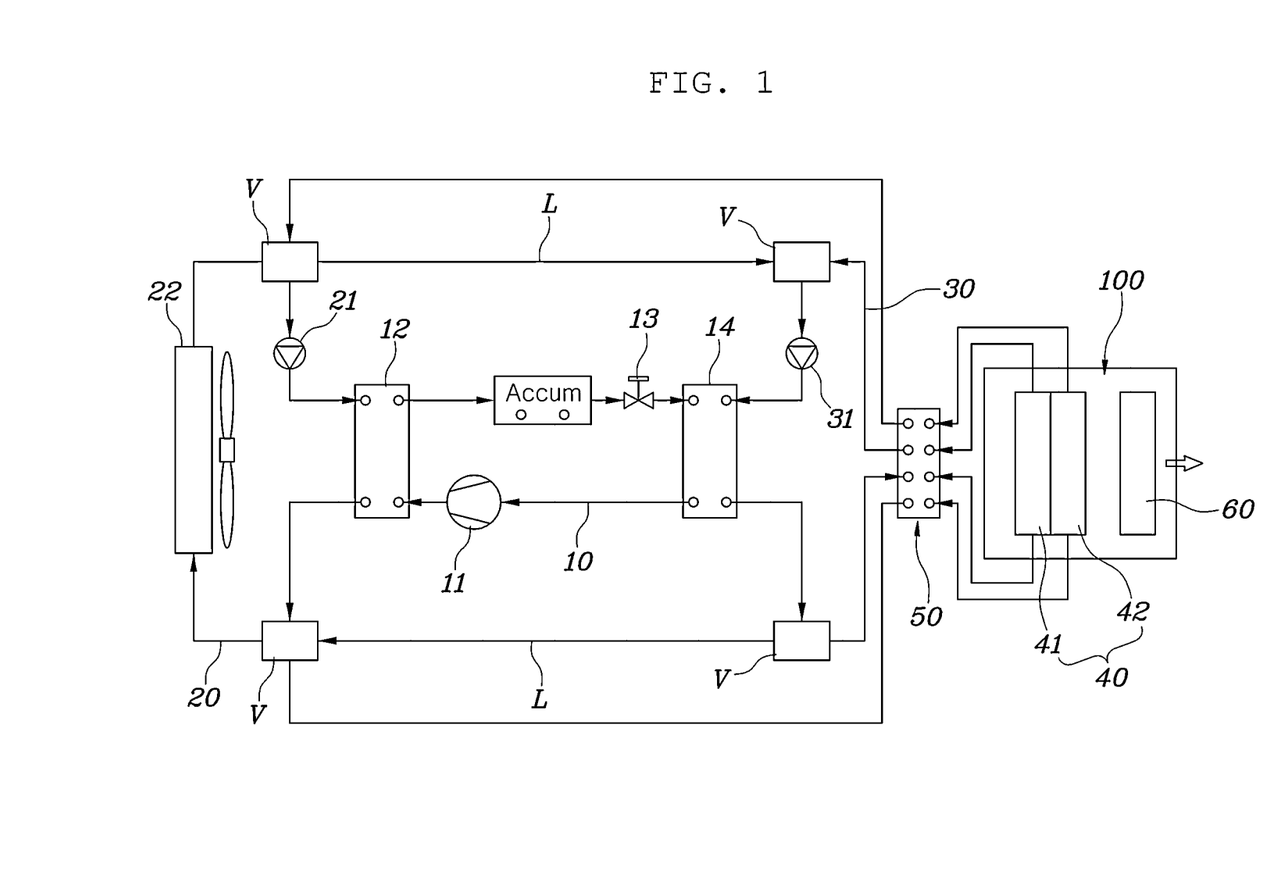
FIG. 1 is a circuit diagram illustrating an air conditioning system with an integrated heat exchanger according to one embodiment of the present disclosure.
Figure 2:
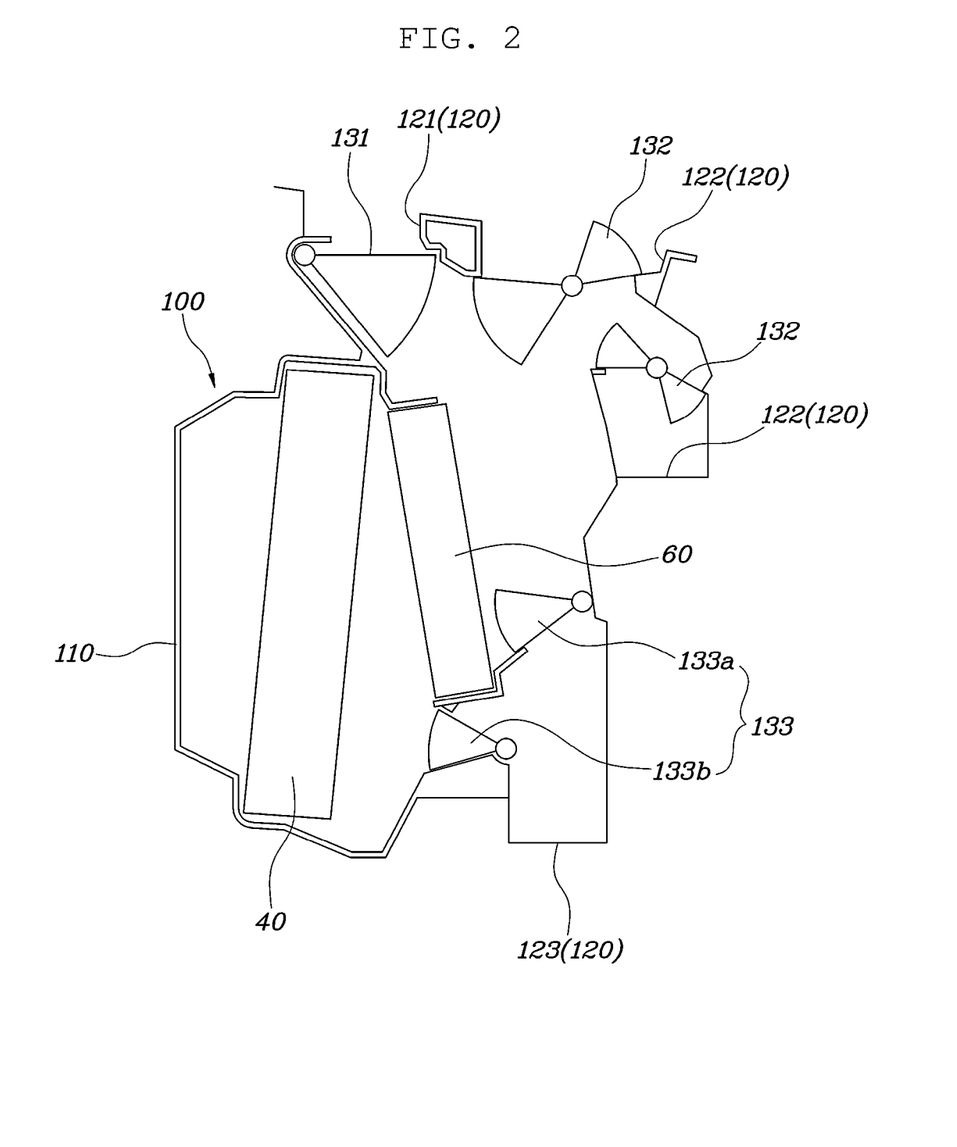
FIG. 2 is a view illustrating an interior of an air conditioner of the air conditioning system with the integrated heat exchanger shown in FIG. 1.
Figure 3:
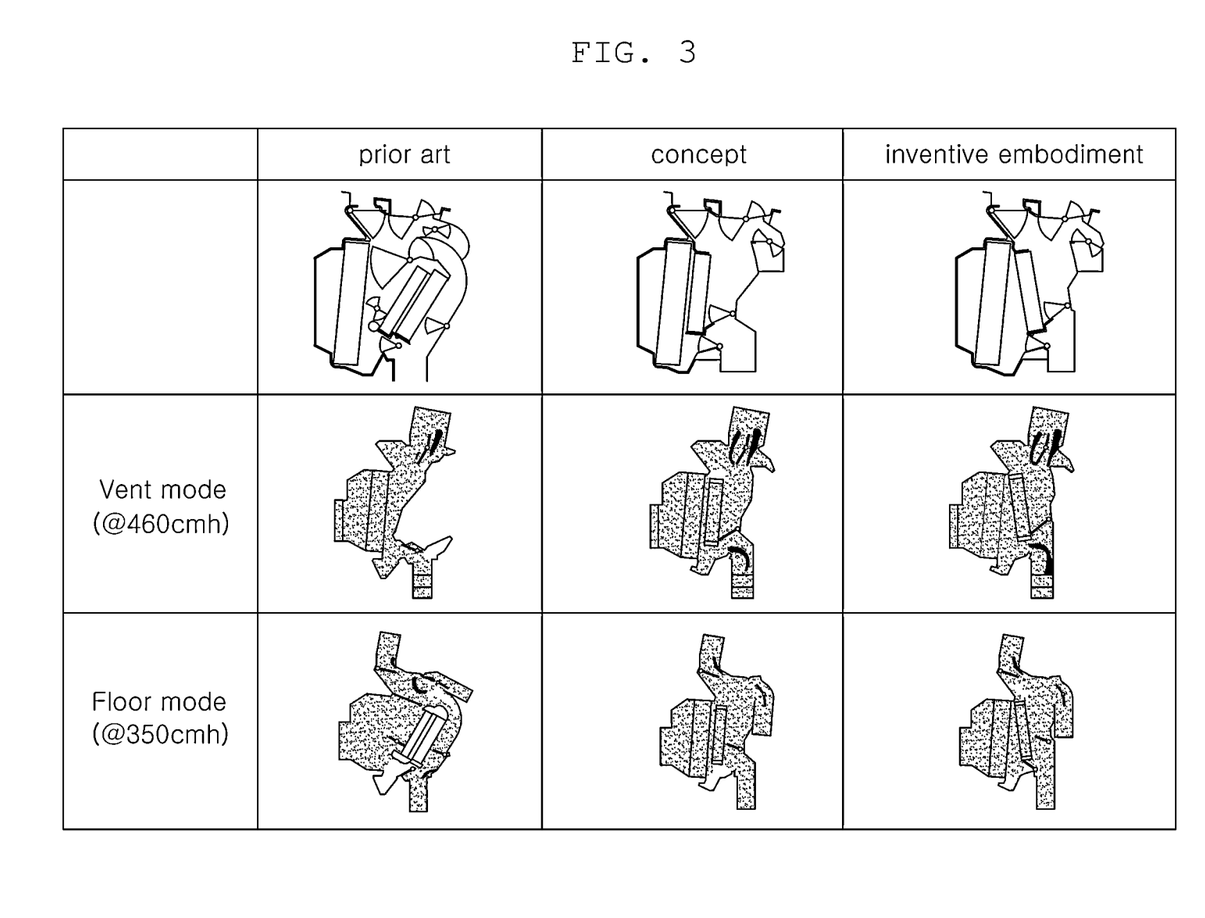
FIG. 3 is a view illustrating an air flow analysis result for explaining the effect of the present disclosure.
Figure 4:
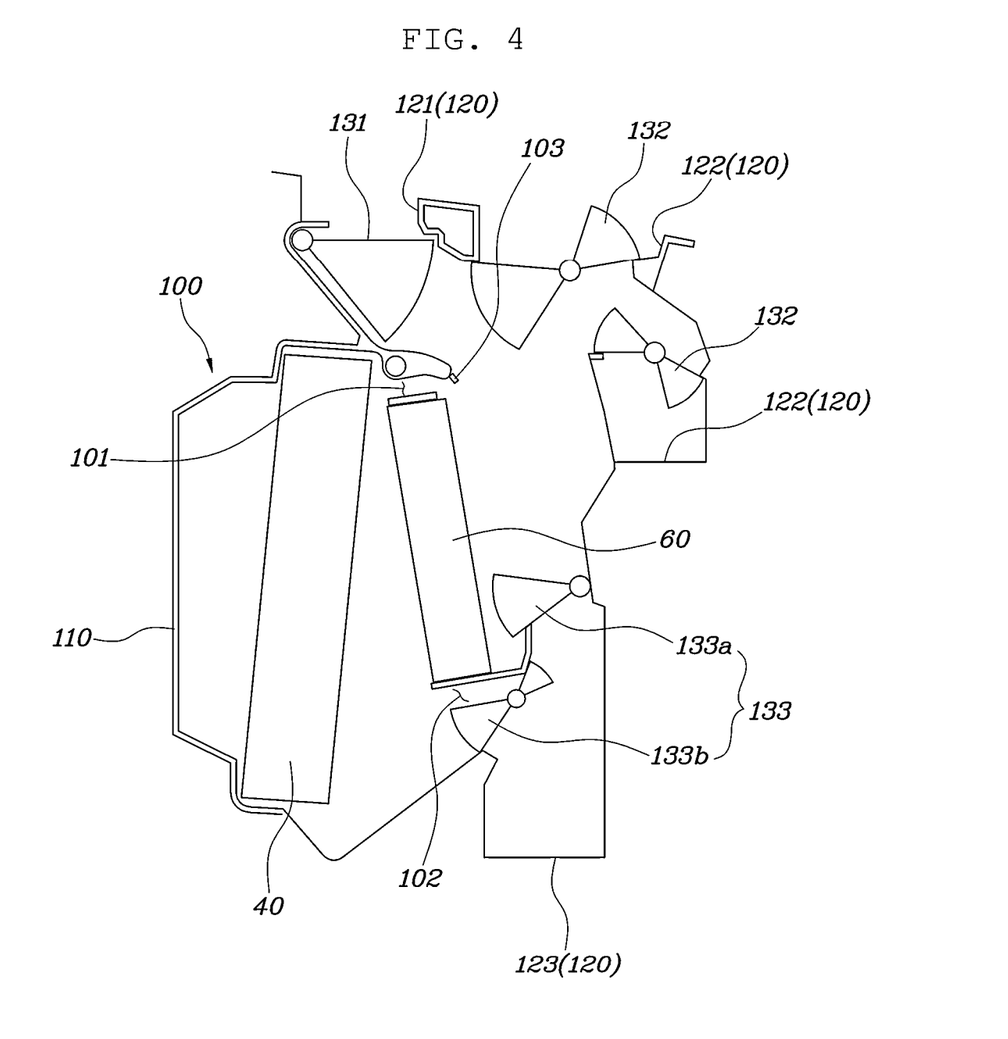
FIG. 4 is a view illustrating the air conditioning system with the integrated heat exchanger according to one embodiment of the present disclosure.
Figure 6:
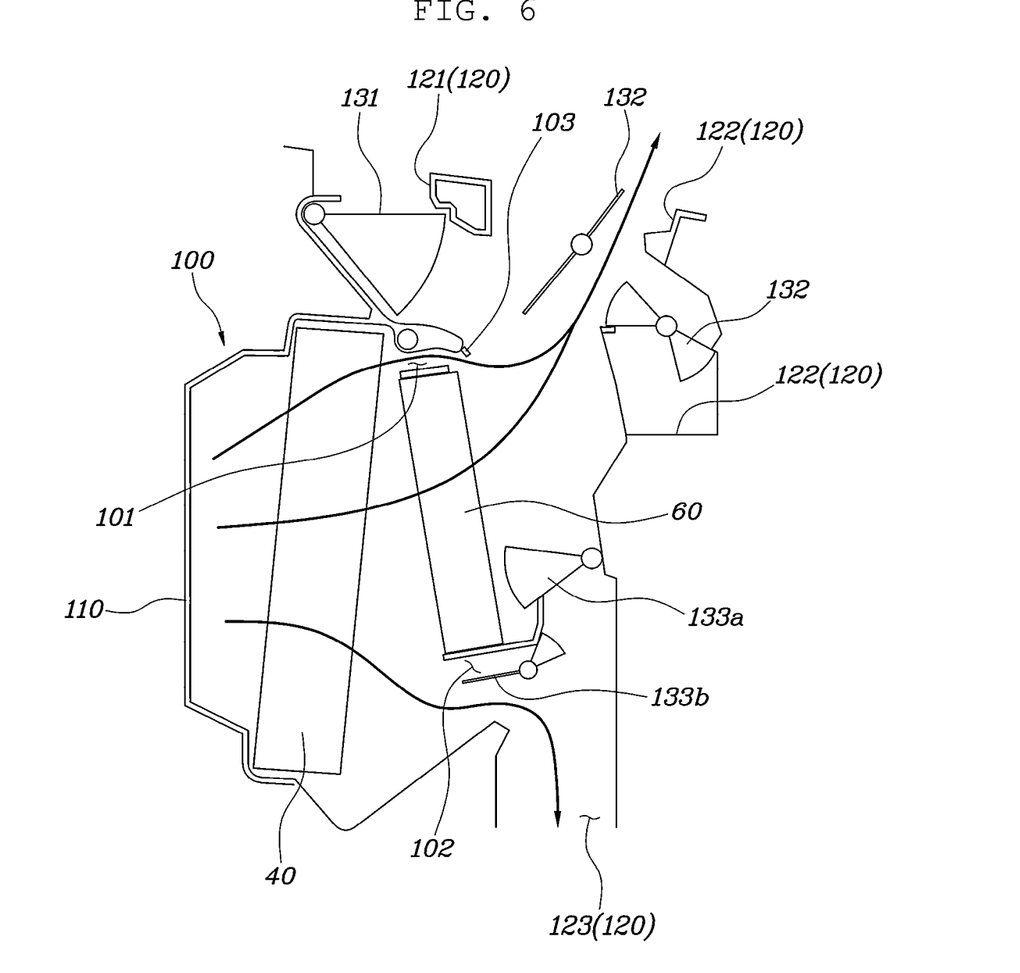
FIG. 6 is a view illustrating the indoor heating of the air conditioning system with the integrated heat exchanger according to one embodiment of the present disclosure.
Figure 7:
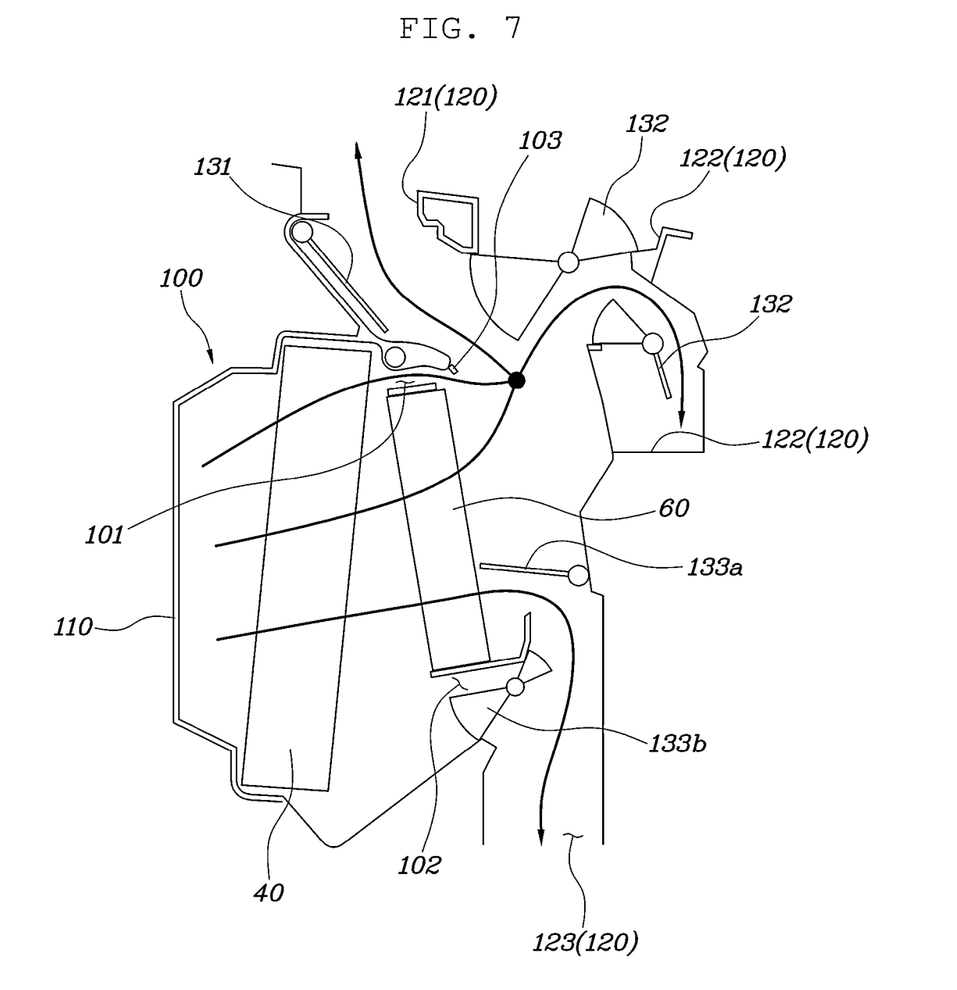
FIG. 7 is a view illustrating the indoor cooling of the air conditioning system with the integrated heat exchanger according to one embodiment of the present disclosure.
Figure 8:
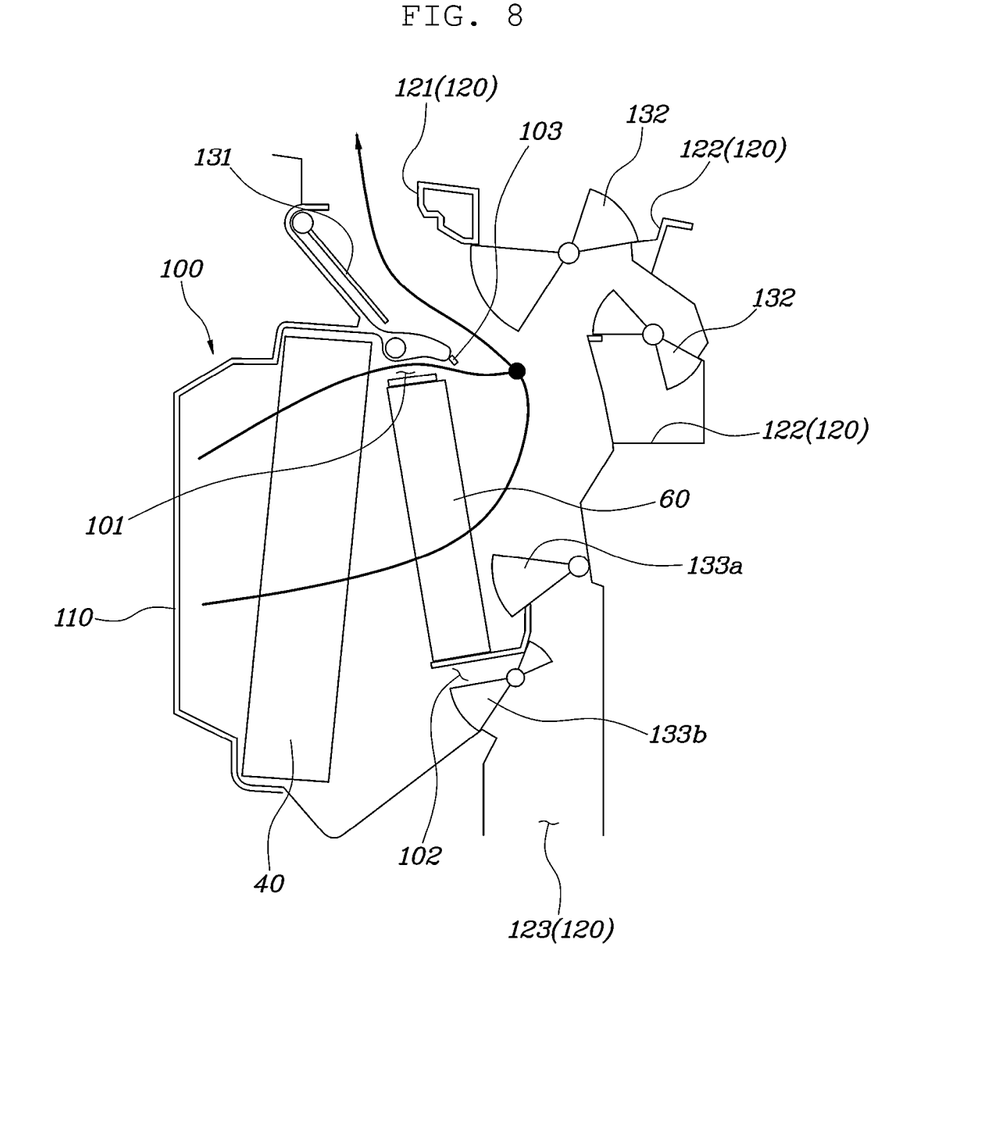
FIG. 8 is a view illustrating the defrost of the air conditioning system with the integrated heat exchanger according to one embodiment of the present disclosure.

FIG. 1 is a circuit diagram illustrating an air conditioning system with an integrated heat exchanger according to one embodiment of the present disclosure, FIG. 2 is a view illustrating an interior of an air conditioner of the air conditioning system with the integrated heat exchanger shown in FIG. 1, FIG. 3 is a view illustrating an air flow analysis result for explaining the effect of the present disclosure, and FIG. 4 is a view illustrating the air conditioning system with the integrated heat exchanger according to one embodiment of the present disclosure. FIG. is a view illustrating a bleed path and a guide part of the integrated heat exchanger shown in FIG. 4, FIG. 6 is a view illustrating the indoor heating of the air conditioning system with the integrated heat exchanger according to one embodiment of the present disclosure, FIG. 7 is a view illustrating the indoor cooling of the air conditioning system with the integrated heat exchanger according to one embodiment of the present disclosure, and FIG. 8 is a view illustrating the defrost of the air conditioning system with the integrated heat exchanger according to one embodiment of the present disclosure.

As shown in FIG. 1, the air conditioning system with the integrated heat exchanger includes a refrigerant circuit through which a refrigerant is circulated. In particular, the refrigerant circuit 10 includes a compressor 11, a condenser 12, an expander 13, and an evaporator 14. The air conditioning system further includes: a first coolant circuit 20 through which heating coolant exchanging heat with the condenser 12 of the refrigerant circuit 10 is circulated; a second coolant circuit 30 through which cooling coolant exchanging heat with the evaporator 14 of the refrigerant circuit 10 is circulated. The air conditioning system further includes: an indoor heat exchanger 40 which is provided in an air conditioner 100 and to which the first coolant circuit and the second coolant circuit 30 are connected to receive the heating coolant and the cooling coolant and thereby create heating air or cooling air; and a valve module 50 to which the first coolant circuit 20 and the second coolant circuit 30 are connected and which controls the heating coolant or the cooling coolant circulated in the indoor heat exchanger 40.

In this regard, the first coolant circuit 20 may include a first water pump 21 and an outdoor heat exchanger 22, and the second coolant circuit 30 may include a second water pump 31. Here, the outdoor heat exchanger 22 may be formed of a radiator.

According to an embodiment of the present disclosure, the refrigerant circuit includes the compressor 11, the condenser 12, the expander 13, and the evaporator 14, and the refrigerant is sequentially circulated through the compressor 11, the condenser 12, the expander 13, and the evaporator 14.

In the refrigerant circuit 10, as the high-temperature and high-pressure refrigerant compressed in the compressor 11 flows into the condenser 12, the coolant circulated through the first coolant circuit 20 connected to the condenser 12 is heated through the heat generation of the condenser 12. Thus, the first coolant circuit 20 includes the condenser 12, and the coolant exchanges heat with the refrigerant through the condenser 12 to be circulated as the heating coolant.

Further, the coolant circulated in the second coolant circuit 30 connected to the evaporator 14 is cooled in the refrigerant circuit 10 by heat absorption through the evaporator 14. Thus, the second coolant circuit 30 includes the evaporator 14, and the coolant exchanges heat with the refrigerant through the evaporator 14 to be circulated as the cooling coolant.

As such, the coolant circulated in each of the first coolant circuit 20 and the second coolant circuit 30 exchanges heat through the condenser 12 and the evaporator 14, and the first coolant circuit 20 and the second coolant circuit 30 are connected such that the coolant is circulated in the indoor heat exchanger 40 provided in the air conditioner 100, and thereby the coolant exchanges heat with conditioning air via the indoor heat exchanger 40. As the first water pump 21 is provided in the first coolant circuit 20, the coolant may be circulated in the first coolant circuit 20. As the second water pump 31 is provided in the second coolant circuit 30, the coolant may be circulated in the second coolant circuit 30.

In particular, since the valve module 50 is connected to the first coolant circuit 20 and the second coolant circuit 30, the heating coolant or the cooling coolant circulated in the indoor heat exchanger 40 may be optionally controlled, thus determining the generation of the heating air or the cooling air through the indoor heat exchanger 40. Here, the valve module 50 may be configured so that a plurality of four-way valves is modularized as a multi-way valve.

Thereby, according to the present disclosure, as the refrigerant is circulated in the refrigerant circuit 10, the temperature of the coolant circulated in the first coolant circuit 20 and the second coolant circuit 30 may be adjusted. Further, as the coolant circulated through the first coolant circuit 20 and the second coolant circuit 30 is optionally circulated in the indoor heat exchanger 40 by the valve module 50, the indoor heat exchanger 40 may provide conditioning air according to the required indoor temperature. Further, as the temperature of the coolant is adjusted by circulating the refrigerant and the heating air or the cooling air is generated in the air conditioner 100 using the coolant, each component of the refrigerant circuit 10 is simplified and thereby the size of a package is reduced according to the refrigerant circulation. In addition, the coolants of different temperatures circulated in the first coolant circuit 20 and the second coolant circuit 30 may be introduced into one indoor heat exchanger 40 to adjust the temperature of the conditioning air, thus allowing the temperature of the conditioning air to be adjusted without a temperature adjustment door by optionally circulating the coolant using the valve module 50.

According to the present disclosure, the coolant may be heated by the condenser 12 while being circulated by operating the first water pump 21 in the first coolant circuit 20, and may be cooled through the outdoor heat exchanger 22 to control the temperature of the coolant. Further, the coolant may be cooled by the evaporator 14 while being circulated by operating the second water pump 31 in the second coolant circuit 30.

Further, the first coolant circuit 20 and the second coolant circuit 30 may optionally share each coolant via a plurality of sharing valves V. The sharing valves V may be provided on each of front and rear ends of the condenser 12 in the first coolant circuit 20 and on each of front and rear ends of the evaporator 14 in the second coolant circuit 30, and the sharing valve V provided on the first coolant circuit 20 and the sharing valve V provided on the second coolant circuit 30 may be connected through a sharing line L. Thereby, depending on whether the sharing valves V of the first coolant circuit 20 and the second coolant circuit 30 are opened or closed, the coolant may be separately circulated in each of the first coolant circuit 20 and the second coolant circuit 30, or the coolant circulated in the first coolant circuit 20 and the second coolant circuit 30 may be shared. Thereby, it is easy to adjust the temperature of the coolant for meeting temperature required for indoor air conditioning, and the coolant can be efficiently managed according to a driving situation and an external environment.

According to the prior art, as the condenser 12 for generating the heating air and the evaporator 14 for generating the cooling air should be spaced apart from each other in the air conditioner 100, and the condenser 12 should be relatively made compact, it is difficult to secure the heat amount of the heating air. In contrast, according to an embodiment of the present disclosure, as the indoor heat exchanger 40 is arranged as a single unit in the air conditioner 100, the overall package of the air conditioner 100 is reduced and the temperature adjustment door is removed, thereby reducing the number of components and weight. In addition, as the indoor heat exchanger 40 performs heat exchange with the conditioning air over an overall area regardless of the generation of the heating air or the cooling air, both cooling performance and heating performance are secured.

The present disclosure will be described below in detail. The indoor heat exchanger 40 may include a first heat exchanging part 41 to which the first coolant circuit is connected to dissipate heat through the heating coolant, and a second heat exchanging part 42 to which the second coolant circuit 30 is connected to absorb heat through the cooling coolant.

That is, the indoor heat exchanger 40 includes the first heat exchanging part 41 and the second heat exchanging part 42. The second heat exchanging part 42 through which the cooling coolant is circulated may be disposed in front of the first heat exchanging part 41 through which the heating coolant is circulated, in an air flow direction.

Further, the first heat exchanging part 41 and the second heat exchanging part 42 may be formed to have the same area, and may include a plurality of tubes through which the coolant is circulated and fins connected to the tubes. In particular, the first heat exchanging part 41 and the second heat exchanging part 42 may be configured such that a folded tube is applied as the tube to ensure corrosion resistance, and a plurality of fins has the same FPDM (fin pitch per decimeter). In one embodiment, the FPDM has a value in a range of 108 to 125. The indoor heat exchanger 40 including the first heat exchanging part 41 and the second heat exchanging part 42 may be configured such that the same volume of coolant is circulated, corrosion resistance and water flow resistance are reduced, and the generation of condensate is minimized.

As shown in FIG. 2, the air conditioning system may further include a heater 60 which is provided in the air conditioner 100 to be spaced apart from the indoor heat exchanger 40, and the indoor heat exchanger 40 and the heater 60 may be arranged at an angle. Such a heater 60 may be a PTC heater to compensate for insufficient heating heat with only the indoor heat exchanger 40 during heating.

In particular, the indoor heat exchanger 40 and the heater 60 may be arranged in an inverted "V" shape as upper portions thereof come near to each other and lower portions thereof move away from each other.

As such, the indoor heat exchanger 40 and the heater are arranged at an angle. Thus, in the case of the indoor heat exchanger 40, it is easy to discharge and scatter condensate when the condensate is generated. In the case of the heater 60, the effect of the condensate generated in the indoor heat exchanger 40 is avoided and thereby the stability of high-voltage components is secured.

Further, the arrangement of the indoor heat exchanger 40 and the heater 60 can minimize the resistance of air flow circulating in the air conditioner 100, thus securing an air volume.

As seen from the air flow analysis result of FIG. 3, it can be seen that the flow resistance is reduced in the arrangement structure of the indoor heat exchanger 40 and the heater 60 according to the present disclosure, compared to the prior art and concept.

Further, as seen from Table 1 showing the following analysis result, it can be seen that a pressure value inside the air conditioner 100 is reduced according to the air flow for each outlet, when comparing the concept with an embodiment of the present disclosure.

TABLE 1

|  |  | EVAP Applied | Specification Review of Integrated Heat Exchanger [mmAq] | |
|---|---|---|---|---|
|  | Mode | Air-volume [CMH] | Concept | Inventive Embodiment |
| Analysis Result | Vent | 450 | (+6.1) | (+5.6) |
|  | Floor | 350 | (−17.4) | (−18.0) |
|  | Def | 350 | (−14.0) | (−14.5) |

This analysis is the analyzed result under the condition that the same air-flow inflow condition, the same heater condition, and the same outlet duct resistance condition are satisfied.

Figure 5:
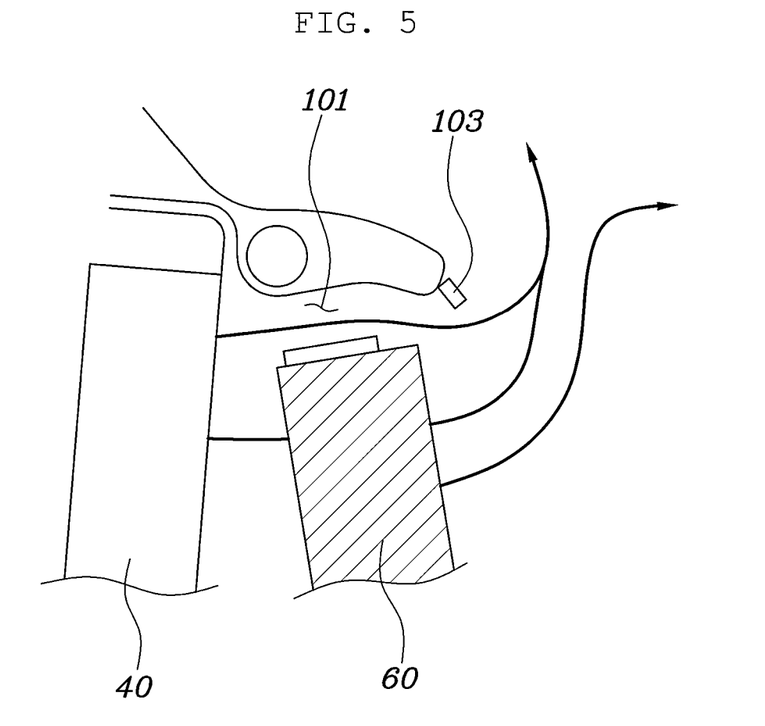
FIG. 5 is a view illustrating a bleed path and a guide part of the integrated heat exchanger shown in FIG. 4.

As shown in FIGS. 4 and 5, the heater 60 is disposed such that at least one path (e.g., path 101, 102) is formed in the air conditioner 100, and thus some of air flowing through the indoor heat exchanger 40 does not pass through the heater 60 and instead flow through the path (e.g., path 101, 102).

Since a plurality of paths (e.g., paths 101 and 102) is formed around the heater 60 in the air conditioner 100, flow resistance caused by the heater 60 being disposed in the air conditioner 100 is eliminated. In other words, as some of the air flowing through the indoor heat exchanger 40 in the air conditioner 100 flows without passing through the heater 60 and instead flows via the path (i.e., via path 101 or 102, or both paths), pressure in the air conditioner 100 can be reduced and the flow can be improved.

In detail, the paths may include a bleed path 101 formed in an upper end of the heater 60 and a bypass path 102 formed in a lower end of the heater. That is, the air conditioner 100 is provided with a plurality of vent holes to discharge conditioning air to various indoor positions, and the vent holes are distributed over the upper and lower ends of the air conditioner 100. Thus, the paths are formed, respectively, on the upper end and the lower end of the heater 60, thus securing the volume of air flowing into each vent hole. Thus, the paths may include the bleed path 101 and the bypass path 102. In the paths, air may flow into an interior through each vent hole depending on whether a door is opened or closed. The door is described below.

The guide part 103 may be formed on an outlet of the bleed path 101 in the air conditioner 100, and the guide part 103 may be obliquely formed so that air passing through the bleed path 101 flows to the heater 60.

Thereby, the air passing through the bleed path 101 among the air passing through the indoor heat exchanger 40 in the air conditioner 100 may flow to the heater 60 by the guide part 103 and then may be mixed with the air passing through the heater 60. For instance, when the heating air is supplied to the interior, the air passing through the bleed path 101 in the air conditioner 100 flows to the heater by the guide part 103 to be mixed with the heating air passing through the heater 60, thus preventing cold air, which does not pass through the heater 60 via the bleed path 101, from flowing into an indoor space. For instance, when a defrost vent hole 121 is provided on the upper end in the air conditioner 100 and the bleed path 101 is provided around the defrost vent hole 121, cold and dry air passing through the bleed path 101 is mixed with warm air passing through the heater 60 by the guide part 103, so dry and warm air may be stably supplied to the defrost vent hole 121. Thus, the inclination angle of the guide part 103 may be formed to be in a range of 5° to 45° in the bleed path 101.

The bleed path 101 may be formed to pass 25% or less of the volume of air passing through the heater 60. When the bleed path 101 is set to pass an air volume exceeding 25% of the volume of air passing through the heater 60, heating performance is deteriorated as the volume of the air passing through the heater 60 is reduced during indoor heating. Therefore, when the volume of air passing through the bleed path 101 is set to 25% or less of the volume of air passing through the heater 60, heating performance can be secured, and pressure in the air conditioner 100 can be reduced by improving the air flow.

In detail, the air conditioner 100 is provided with an air inlet 110 and a plurality of air outlets 120. The plurality of air outlets includes at least one defrost vent hole (e.g., a defrost vent) 121 and front vent hole (e.g., a front vent) 122 in an upper portion of the air conditioner 100, and includes at least one rear vent hole (e.g., a rear vent) 123 in a lower portion thereof. The vent holes (i.e., the at least one defrost vent, the front vent, and the at least one rear vent) are provided with a defrost door 131, a front door 132, and a rear door 133, respectively.

In the air conditioner 100, air introduced through the air inlet 110 flows through the air outlets 120 to the indoor space. In particular, the air outlets 120 are provided with the defrost vent hole 121, the front vent hole 122, and the rear vent hole 123 to supply conditioning air to various positions of the indoor space. Each vent hole may be additionally formed or each vent hole may be branched so that air flows to various positions in the indoor space.

Here, the defrost vent hole 121 and the front vent hole 122 are formed in the upper portion of the air conditioner 100, so air passing through the bleed path 101 on the upper end of the heater 60 is mixed with air passing through the indoor heat exchanger 40 and the heater 60 to flow to the defrost vent hole 121 and the front vent hole 122. Further, the rear vent hole 123 is formed in the lower portion of the air conditioner 100, so air passing through the bypass path 102 on the lower end of the heater 60 is mixed with air passing through the indoor heat exchanger 40 and the heater 60 to flow to the rear vent hole 123.

As such, while the air flowing in the air conditioner 100 optionally flows to the defrost vent hole 121, the front vent hole 122, and the rear vent hole 123 depending on whether the defrost door 131, the front door 132, and the rear door 133 are opened or closed, conditioning air may be provided to a required position in the indoor space.

In particular, the rear door 133 may include a first rear door 133a which optionally allows air passing through the heater 60 to be circulated in the rear vent hole 123, and a second rear door 133b which optionally allows air passing through the indoor heat exchanger 40 in the bypass path on the lower end of the heater 60 to be circulated in the rear vent hole 123 without passing through the heater 60.

Since the rear door 133 includes the first rear door 133a and the second rear door 133b, cooling air passing through the indoor heat exchanger 40 during indoor cooling may flow to an indoor side without passing through the heater by opening the second rear door 133b, thus securing the volume of air flowing to the indoor rear space.

Further, as the first rear door 133a is opened and the second rear door 133b is closed during indoor heating, air passing through the indoor heat exchanger 40 and the heater 60 may flow to the indoor rear space.

According to one embodiment, during indoor heating, as shown in FIG. 6, the heating coolant of the first coolant circuit 20 is circulated in the indoor heat exchanger 40 and the heater 60 is operated, so heating air may be generated in the air conditioner 100 and thereby the heating air may be supplied through each vent hole. In addition, as the heater 60 is installed in the air conditioner 100 to have a wide area, it is easy to generate heating air through the heater 60 and thereby it is possible to secure the heat amount of the heating air. Further, the bleed path 101 and the bypass path 102 are formed around the heater 60 in the air conditioner 100, so air flowability is improved, and thereby pressure in the air conditioner 100 is reduced and the air volume is increased.

On the other hand, during indoor cooling, as shown in FIG. 7, the cooling coolant of the second coolant circuit 30 is circulated in the indoor heat exchanger 40 and the heater 60 is not operated, so cooling air may be generated in the air conditioner 100 and thereby the cooling air may be supplied through each vent hole. In addition, the bleed path 101 and the bypass path 102 are formed around the heater 60, so the air volume is secured and pressure in the air conditioner 100 is reduced. In particular, as air flowing to the indoor rear space directly flows without passing through the heat exchanger via the bypass path 102 formed in the lower end of the heater 60, the air volume may be secured and thereby cooling performance may be improved.

Further, when performing defrost, as shown in FIG. 8, air passing through the indoor heat exchanger 40 and the heater 60 flows to the defrost vent hole 121, the air volume is secured through the bleed path 101 formed in the upper end of the heater 60, and thereby it is possible to satisfy the air volume required in the defrost. In addition, the guide part 103 is provided in the bleed path 101, so air passing through the bleed path 101 is smoothly mixed with air passing through the heater 60, and thereby conditioning air required in the defrost may be smoothly supplied.

As described above, the present disclosure provides an air conditioning system with an integrated heat exchanger, which generates heating air or cooling air through the integrated heat exchanger that adjusts the temperature of conditioning air by circulating coolant, thus securing cooling and heating efficiency. In addition, the air conditioning system adjusts temperature by the coolant circulated in the integrated heat exchanger, so a temperature adjustment door for adjusting the temperature of the conditioning air is eliminated, thus reducing the number of components, optimizing the arrangement of components, and reducing the size of an overall package.

Although the present disclosure was described with reference to specific embodiments shown in the drawings, it is apparent to those having ordinary skill in the art that the present disclosure may be changed and modified in various ways without departing from the scope of the present disclosure.

What is claimed is:

1. An air conditioning system with an integrated heat exchanger, the air conditioning system comprising:
   a refrigerant circuit through which a refrigerant is circulated, the refrigerant circuit including a compressor, a condenser, an expander, and an evaporator;
   a first coolant circuit through which heating coolant exchanging heat with the condenser of the refrigerant circuit is circulated;
   a second coolant circuit through which cooling coolant exchanging heat with the evaporator of the refrigerant circuit is circulated;
   an indoor heat exchanger which is provided in an air conditioner and to which the first coolant circuit and the second coolant circuit are connected to receive the heating coolant and the cooling coolant and thereby generate heating air or cooling air; and
   a valve module to which the first coolant circuit and the second coolant circuit are connected, the valve module configured to control the heating coolant or the cooling coolant circulated in the indoor heat exchanger,
   wherein the first coolant circuit comprises a first water pump and an outdoor heat exchanger, and the second coolant circuit comprises a second water pump.

2. An air conditioning system with an integrated heat exchanger, the air conditioning system comprising:
   a refrigerant circuit through which a refrigerant is circulated, the refrigerant circuit including a compressor, a condenser, an expander, and an evaporator;

a first coolant circuit through which heating coolant exchanging heat with the condenser of the refrigerant circuit is circulated;

a second coolant circuit through which cooling coolant exchanging heat with the evaporator of the refrigerant circuit is circulated;

an indoor heat exchanger which is provided in an air conditioner and to which the first coolant circuit and the second coolant circuit are connected to receive the heating coolant and the cooling coolant and thereby generate heating air or cooling air; and a valve module to which the first coolant circuit and the second coolant circuit are connected, the valve module configured to control the heating coolant or the cooling coolant circulated in the indoor heat exchanger, wherein the indoor heat exchanger comprises:

a first heat exchanging part to which the first coolant circuit is connected and configured to dissipate heat through the heating coolant; and a second heat exchanging part to which the second coolant circuit is connected and configured to absorb heat through the cooling coolant.

3. The air conditioning system of claim 1, further comprising:

a heater provided in the air conditioner to be spaced apart from the indoor heat exchanger, wherein the indoor heat exchanger and the heater are arranged at an angle.

4. The air conditioning system of claim 3, wherein the indoor heat exchanger and the heater are arranged such that upper portions thereof come near to each other and lower portions thereof move away from each other.

5. The air conditioning system of claim 3, wherein the heater is arranged to form at least one path in the air conditioner to allow a portion of air, which has passed through the indoor heat exchanger, to flow via the at least one path.

6. The air conditioning system of claim 5, wherein the at least one path comprises: a bleed path formed in an upper end of the heater, and a bypass path formed in a lower end of the heater.

7. The air conditioning system of claim 6, wherein a guide part is formed on an outlet of the bleed path in the air conditioner, and the guide part is obliquely formed so that air passing through the bleed path flows to the heater.

8. The air conditioning system of claim 6, wherein the bleed path is formed to pass 25% or less of a volume of air passing through the heater.

9. The air conditioning system of claim 6, wherein the air conditioner is provided with an air inlet and a plurality of air outlets, and wherein the plurality of air outlets comprises: at least one defrost vent and front vent arranged in an upper portion of the air conditioner, and at least one rear vent arranged in a lower portion of the air conditioner.

10. The air conditioning system of claim 9, wherein a defrost door is provided in the defrost vent, a front door is provided in the front vent, and at least one rear door is provided in the at least one rear vent.

11. The air conditioning system of claim 10, wherein the at least one rear door comprises a first rear door configured to optionally allow air passing through the heater to be circulated in the at least one rear vent, and a second rear door configured to optionally allow air passing through the indoor heat exchanger in the bypass path on the lower end of the heater to be circulated in the at least one rear vent without passing through the heater.

12. The air conditioning system of claim 1, wherein the first coolant circuit and the second coolant circuit optionally share each coolant via a plurality of sharing valves.

* * * * *